Dec. 28, 1965 KUNIO ISHIMOTO ET AL 3,226,651

MONITOR FOR A FEEDBACK AMPLIFIER

Filed April 16, 1962 2 Sheets-Sheet 1

Inventor
K. ISHIMOTO-
K. NAKAMURA
By Arthur M. Lieberman
AGENT

MONITOR FOR A FEEDBACK AMPLIFIER

Filed April 16, 1962 2 Sheets-Sheet 2

Inventor
K. ISHIMOTO-
K. NAKAMURA
By [signature]
AGENT

3,226,651
MONITOR FOR A FEEDBACK AMPLIFIER

Kunio Ishimoto and Kiyoshi Nakamura, both of Minato-ku, Tokyo, Japan, assignors to Nippon Electric Company, Limited, Minato-ku, Tokyo, Japan, a corporation of Japan Filed Apr. 16, 1962, Ser. No. 187,657
Claims priority, application Japan, Apr. 18, 1961, 36/13,486
1 Claim. (Cl. 330—2)

This invention relates to a feedback amplifier of the continuously operable type; that is an amplifying device capable of sustaining its assigned functions (gain, impedance, phase, etc.) despite a malfunction in any of the amplifying paths. In particular the invention deals with the problems inherent in detecting the incipient stage of deterioration in one or more of these paths.

As is well known, signal interruption may cause considerable damage to the data being transmitted. This is especially true when one considers high speed data transmission or coded modulation as opposed to ordinary speech. Hence it has become a common practice to utilize an amplifier having a plurality of amplifying paths, such as that shown in FIG. 1(*a*), to insure continuity of service.

The monitoring of this type of equipment to prevent complete failure presents a serious problem. This is due to the fact that functionally the overall amplifier produces a continuous and uniform output regardless of malfunction in the individual amplifying paths (how this is accomplished will be explained hereafter). Malfunction in the various paths must therefore be ascertained quickly by maintenance personnel so that the faulty equipment can be replaced. If this is not done additional malfunctions may accumulate resulting in a complete failure of the equipment.

Since each of amplifying paths shares in the load, and is continuously operational, it is also desirable, from the viewpoint of preventive maintenance, to monitor the equipment at regular intervals so as to detect, at the initial stage, any deterioration in the operating characteristics of a single path. Moreover, it is preferable that an occurrence of this nature be coupled to some suitable means for bringing it to the attention of the maintenance personnel. Since, however, amplifying devices used in equipment having the stringent requirement of continuous operability are generally provided with a large negative feedback, to stabilize the gain, an early detection of the deterioration of one path is extremely difficult.

Hence an object of the present invention is to provide a feedback amplifier of the continuously operable type, having a plurality of parallel amplifying paths, with monitoring means which will detect the deterioration in the characteristics of any one of the amplifying paths at its incipient stage.

It is a further object of this invention to provide such monitoring means as are easily adaptable to the coupling of an automatic alarm for alerting maintenance personnel of the initial deterioration.

The above-mentioned and other features and objects of this invention and the manner of attaining them will become more apparent and the invention itself will best be understood by reference to the following description of an embodiment of the invention taken in conjunction with the accompanying drawings wherein:

FIG. 1(*b*) is a vector diagram for illustrating the operation of the circuit of FIG. 1(*a*);

In order to clarify the invention disclosed herein a conventional continuously operable amplifier will first be described with reference to FIGS. 1(*a*) and 1(*b*).

Figure 1A:
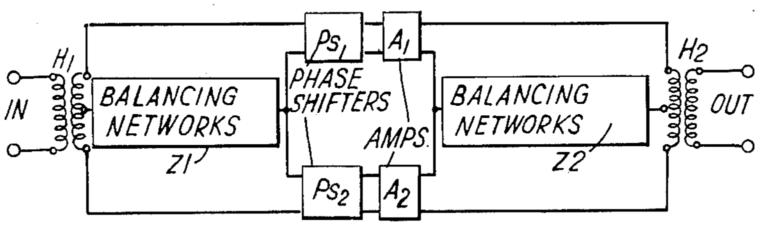
Fig. 1(a). PRIOR ART
FIG. 1(*a*) illustrates a conventional continuously operable amplifier device.
Figure 1B:
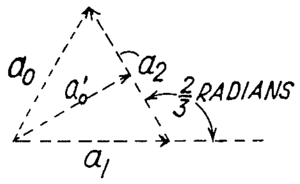
Fig. 1(b). PRIOR ART

In FIG. 1(*a*) two amplifiers $A_1$ and $A_2$ are coupled to each other by input and output hybrid circuits $H_1$ and $H_2$ which have balancing networks $Z_1$ and $Z_2$ respectively (assume for the moment that the two phase shifters $Ps_1$ and $Ps_2$ are not present). The balancing networks $Z_1$ and $Z_2$ introduce a large attenuation in the path-to-path direction thereby insuring a disturbance in one amplifier does not directly affect the other and interrupt the output. In such a device, the signal transmission between the input terminal IN and the output terminal OUT will not be interrupted even if the amplifier $A_1$ or the amplifier $A_2$ is damaged. However, it is to be noted that the transmission gain will then be changed, and if either one of the amplifiers $A_1$ and $A_2$ entirely loses its function, a gain variation of $-6$ db will result. In order to reduce the gain variation, phase shifters $Ps_1$ and $Ps_2$ are inserted, as shown, between the input hybrid circuit $H_1$ and the amplifiers $A_1$ and $A_2$ respectively, so that a phase difference of $2\pi/3$ radians between the output component $a_1$ of the amplifier $A_1$ and the output component $a_2$ of the amplifier $A_2$ may be obtained. In this manner, the composed output $a_0$ obtained at the output terminal OUT by the recomposition of the transmitted signals at the hybrid circuit $H_2$ becomes as shown in FIG. 1(*b*), and the vector diagram formed by the output component $a_1$, the output component $a_2$, and the composed output $a_0$ becomes an equilateral triangle. Therefore, when a malfunction occurs in one of the amplifiers, for example in the amplifier $A_2$, and its output component $a_2$ gradually decreases, the composed output will vary from the initial $a_0$ through $a_0'$ to $a_1$. If the vector diagram is an exact equilateral triangle, the output of this amplifier device will be minimum at the position of the vector $a_0'$, and will be smaller than the initial value by only 1.2 db. Furthermore, the phase of the composed output will then shift by $\pi/3$ radians at maximum.

Since it is necessary for the characteristics (such as gain, phase shift and the like) of both amplifiers $A_1$ and $A_2$ to be as stable as possible, under normal operation, these amplifiers are almost always provided with sufficient negative feedback to effect this result.

On the other hand, the need arises to monitor such amplifiers; it also being desirable to monitor them while they are both operational. This is due to the fact that although the removal of one amplifier, for measuring its characteristics, does not interrupt the signal transmission (only 1.2 db as explained), the other amplifier may develop trouble during the take down. In addition, such removal from service for mere observation is a nuisance.

However, monitoring with the amplifiers under normal operation would involve the monitoring of the feedback gain of the amplifier device in some form or other. Inasmuch as the feedback gain is extremely stable, detection of an incipient trouble, such as the lowering of the feedback in each amplifier (which is a potent index for the deterioration in a feedback amplifier), or the like, becomes extremely difficult.

Figure 2:
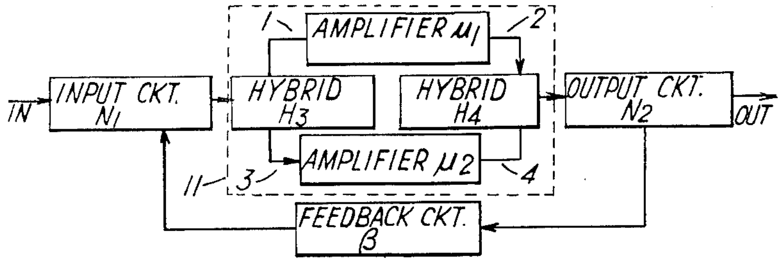
FIG. 2 illustrates in block form the continuously operable amplifier device to be adapted with monitoring means according to the invention.

FIG. 2 illustrates a continuously operable amplifier (such as is described in a copending application of the same assignee "A Feedback Amplifier," filed Oct. 24, 1961, Serial No. 147,278) which is to be adapted with monitoring means according to the invention.

As shown in FIG. 2 the amplifying device is so arranged that the input signal is supplied from input circuit $N_1$ to two amplifying paths $\mu_1$ and $\mu_2$, which have similar characteristics, by input hybrid circuit $H_3$. $H_3$ supplies the equally divided outputs of both the input circuit $N_1$ and a feedback circuit $\beta$ to these amplifying paths while avoiding as much as possible interference between the two amplifying paths. The output voltages of these amplifying paths are applied to both output circuit $N_2$ and feedback circuit $\beta$ by an output hybrid circuit $H_4$ which recomposes the two output voltages again avoiding as much as possible any interference between these amplifying paths. The output signal is then available at the output circuit $N_2$ at an output terminal OUT. Briefly stated, the amplifier device is a feedback amplifier comprising an input and output circuit $N_1$ and $N_2$, a feedback circuit $\beta$, and an amplifying circuit 11.

What is meant by the phrase "avoiding as much as possible interference between the two amplifying paths" ($\mu_1$ and $\mu_2$) is that by making the attenuations in the directions $\mu_1—H_3—\mu_2$ and $\mu_1—H_4—\mu_2$ large at the input and output hybrid circuits $H_3$ and $H_4$, the transmission functions of the amplifying paths $\mu_1$ and $\mu_2$ are decided substantially by the conditions of the respective amplifying paths and not by the condition of the other of the amplifying paths. Therefore, whatever malfunctions may occur in either of the amplifying paths $\mu_1$ and $\mu_2$, the transmission function of the amplifying circuit 11 is not lost and the gain reduction of the amplifying circuit 11 is only 6 db at maximum. It is to be noted here that in the whole amplifier device the gain variation is that of the amplifying circuit 11 as reduced in accordance with feedback values of the feedback circuit $\beta$. Thus, if the feedback value is 36 db before the occurrence of the damage, a gain reduction of 6 db in the amplifying circuit 11 will cause a gain reduction of only about 0.1 db in the whole amplifier device. Also, the variations of the input and output impedances and of the phase shifting characteristics are reduced according to the feedback values of the feedback circuit.

Considering now the signals on output sides 2 and 4 of the amplifying paths $\mu_1$ and $\mu_2$ it will be understood that, inasmuch as a large amount of attenuation is secured by the output-side hybrid circuit $H_4$ in the direction $\mu_1—H_4—\mu_2$, the signals on the output sides contain the output signals of the amplifying paths $\mu_1$ and $\mu_2$ alone and contain very little of the output signals of the companion amplifying paths $\mu_2$ and $\mu_1$, respectively. If input signal voltage at the input terminal IN is denoted by $e_i$, and both input signal voltages for the amplifying paths $\mu_1$ and $\mu_2$ at points 1 and 3, when the amount of feedback due to the feedback circuit $\beta$ is zero, by $k_1e_i$ (the two input signal voltages are assumed to be equal); then both the input signal voltages at the points 1 and 3 become $k_1e_i/(1+k\mu\beta)$ for the amount of feedback $k\mu\beta$, while the output signal voltages $E_1$ and $E_2$ of the amplifying paths $\mu_1$ and $\mu_2$ at the points 2 and 4 and the output signal voltage E at the output terminal OUT are given by the following equations:

$$\begin{aligned} E_1&=[k_1\mu_1/(1+k\mu\beta)]e_i \\ E_2&=[k_1\mu_2/(1+k\mu\beta)]e_i \\ E&=k_0(E_1+E_2)=[k_1k_0\mu/(1+k\mu\beta)]e_i \end{aligned} \quad (1)$$

wherein $\mu_1$, $\mu_2$, and $\beta$ denote transmission constants of the amplifying paths $\mu_1$ and $\mu_2$ and the feedback circuit $\beta$, respectively; $\mu$ is equal to $\mu_1$ plus $\mu_2$; $k$ is a constant determined mainly by the circuits $N_1$, $H_3$, $H_4$ and $N_2$; $k_1$ and $k_0$ are constants determined mainly by the circuits $N_1$ and $H_3$ and the circuits $H_4$ and $N_2$, respectively.

Now, the relations between Equations 1 give the following equations:

$$\begin{aligned} E_2/E&=\mu_1/k_0\mu=\mu_1/[k_0(\mu_1+\mu_2)] \\ E_2/E&=\mu_2/k_0\mu=\mu_2/[k_0(\mu_1+\mu_2)] \\ E_1/E_2&=\mu_2/\mu_2 \end{aligned} \quad (2)$$

It will, therefore, be evident that any one of these deduced ratios is unaffected by the amount of feedback of the feedback amplifier device, but is subject to changes in $\mu_1$ and $\mu_2$. In particular, the fluctuation of the ratio $E_1/E_2$ is directly subject to the variation of $\mu_1$ and $\mu_2$. The relations expressed by the Equations 2 are extremely favorable in monitoring the operation of each amplifying path during normal operation. Even if the amount of feedback in this equipment is large, and hence the external gain (the gain obtainable between the input and output terminals IN and OUT) is fully stabilized, changes in the gain ($\mu_1$ and $\mu_2$) of each amplifying path (which is in general the best index for the deterioration in operation characteristics of such a path) can promptly be detected by monitoring any of the ratios $E_1/E$, $E_2/E$, or $E_1/E_2$, or their reciprocals.

Provided the feedback amplifier device meets the relation $k\mu\beta \gg 1$ and the input voltage $e_i$ is fully stabilized, E in Equation 1 becomes approximately equal to $(k_1k_0/k\beta)\ e_i$ and is highly stabilized. As another example, let us consider a case where the feedback amplifier device is used as a component part in a pilot automatic gain control device; the input signal containing a pilot signal, and the pilot signal contained in the amplified output being selected and amplified to perform the automatic gain control. Even in this case, the pilot signal voltage E at the output terminal OUT is extremely stabilized. If it is possible to warrant anyhow the stability of the output voltage E of the negative feedback amplifier, then it is sufficient to monitor $E_1$ and $E_2$ only.

The above type monitoring has a further advantage in that, even if the output side of the amplifying path $\mu_1$ is inadvertently short-circuited in the monitoring thereof, no interference is given to the signal transmission between the input and output terminals because of the aforementioned principles of continuous operation.

Figure 3:
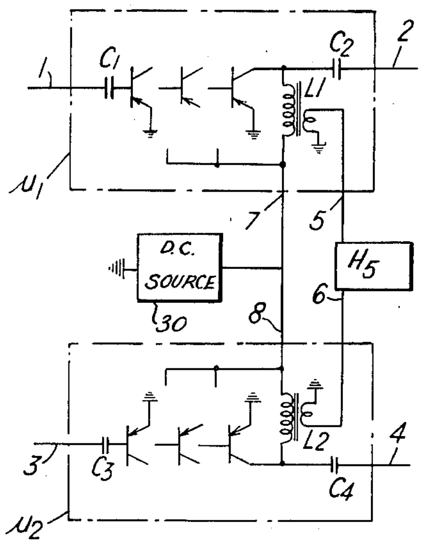
FIG. 3 shows the modified construction of the amplifying path according to the invention.

In FIG. 3, which shows one construction of the amplifying paths to be utilized according to the invention, each path is so composed, that only the transmission signals are transmitted, while the direct currents are blocked by condensers $C_1$, $C_2$, $C_3$, and $C_4$. This prevents a D.C. trouble occurring in one amplifying path from causing a chain of malfunctions in the other amplifying path, hybrid circuits, input and output circuits, or feedback circuit. Inasmuch as the feedback amplifier device herein disclosed is primarily designed so that if either amplifying path malfunctions it may be replaced with a new one, it is advisable for the amplifying paths $\mu_1$ and $\mu_2$ in FIGS. 2 and 3 to be mounted separately. It is, therefore, also preferable that the direct current circuits necessary for the operation of the amplifier elements (in this case transistors) contained in the amplifying paths be separated from the input and output circuits as well as the hybrid circuits. Use is made of the condensers $C_1$, $C_2$, $C_3$, and $C_4$ as well as the choke coils $L_1$ and $L_2$ for constituting the direct current circuits. The direct currents necessary for the operation of these amplifying paths are supplied from D.C. source 30 connected to points 7 and 8.

Turning now to the main purpose of FIG. 3 each of the coils $L_1$ and $L_2$ is provided with a secondary winding. This makes it possible to monitor the signal voltages, of the amplifying paths, at points 5 and 6 with low input impedance monitoring equipment (75 ohms for example). In this manner, with the turns ratio acting to limit the load on the amplifiers the use of monitoring equipment having a large impedance (which impedance would be necessary for the direct monitoring of voltage on output sides 2 and 4) can be avoided. This transformer action also effectively isolates D.C. components that would otherwise be superimposed on the signal.

Figure 4:
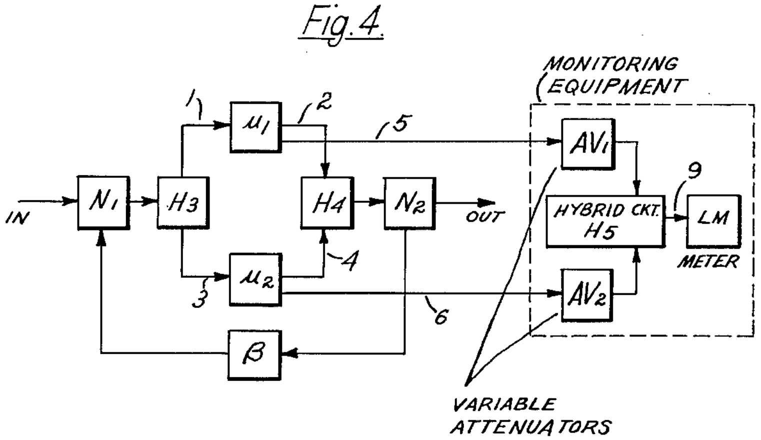
FIG. 4 illustrates the adaptation of the device of FIGURES 2 and 3 to a simultaneous comparison between the amplifying paths.

FIG. 4 shows the embodiment of FIG. 3 as applied to the device of FIG. 2 according to the invention. It is to be understood that the part including the amplifying paths $\mu_1$ and $\mu_2$ and the remaining portion except for an operation-monitoring circuit 12 are of the same construction as in FIGS. 3 and 2, respectively. In the monitoring equipment 12, variable attenuators $AV_1$ and $AV_2$, having dials graduated in suitable decibel steps, are connected with each other through a hybrid circuit $H_5$ so that the amount of attenuation in the direction $$AV_1 - H_5 - AV_2$$

is large.

Generally speaking, the values of $E_1$, $E_2$, and E in Equation 1 or 2 do not make sense unless they are monitored or measured simultaneously, since the level of the transmission signal varies from instant to instant. To monitor these values simultaneously is generally difficult, whereas to monitor these values in succession, one must resort to a pilot signal or the like which maintains a constant level. This is technically laborious and uneconomical.

The constructional example of FIG. 4 belongs to a system wherein monitoring and comparing of $E_1$ and $E_2$ in Equation 2 are simultaneously performed, without using an operation monitoring pilot as mentioned previously. Inasmuch as the output voltages $E_1$ and $E_2$ are so combined, if such voltages are approximately in phase or in opposite phase with each other, across specific terminals of the hybrid circuit $H_5$, so as to cancel each other out, connection of those terminals to a point 9 (in FIG. 4) and of the point 9 to a level meter LM having suitable sensitivity, will make the level meter indicate a minimum value when the variable attenuator $AV_1$ and $AV_2$ are suitably adjusted. The hybrid circuit $H_5$ which performs the combining indicated above, can be one of many known types, for example, the hybrid coil $H_2$ and the balancing network $Z_2$ shown in FIGURE 1(*a*). With this construction the level meter LM would be connected across this secondary winding. Since this minimum signifies that the gain of the amplifying path having a lesser amount of attenuation in the variable attenuator is smaller than the gain of the other amplifying path, by the difference between readings of the two variable attenuators, the monitoring object can be attained. Although it is possible by such means to monitor, as will be understood from Equation 2, all of the ratios $E_1/E$, $E_2/E$, and $E_1/E_2$ or the reciprocals thereof, the monitoring of $E_1/E_2$ only is sufficient for practical use.

Among the advantages of this construction, in addition to the fact that each amplifying path can be monitored at the prescribed position and in normal operation without using a pilot signal are:

(1) Since the operation monitoring is capable of monitoring the total transmission signal level the level meter need not be so frequency sensitive as in the case where a monitoring pilot signal is used, but may be an ordinary type level meter or the like having a flat frequency response.

(2) The construction of the operation monitoring circuit 12 is extremely simple. It will be understood moreover that where a number of feedback amplifier devices of the same construction are used collectively, operation-monitoring circuits need not be furnished to all the amplifier devices; one operation monitoring circuit may be used in common to all.

(3) Although a normal flat frequency response is usually sufficient for the operation-monitoring circuit 12, one having an extremely wide-band can also be used. Therefore, such a circuit can be applicable to feedback amplifier devices having different transmission frequency bands. For instance, two operation-monitoring circuits are sufficient to cover the frequency band from 10 kc. through 15 mc.

(4) The operation of the operation-monitoring circuit is extremely simple.

(5) In addition, from the above description of the invention with reference to FIG. 4, it may be seen that the device is easily adaptable to an automatic alarm when the characteristics vary by a predetermined amount. For example, in the case where the outputs of the monitoring points are obtained 180° out of phase, in the hybrid circuit $H_5$, a null should result at lead 9. Hence a relay may be provided, in parallel to the meter, set to respond to a predetermined value of current (the relay triggering an alarm). The current through the relay will depend not only upon the gain comparison between the amplifying paths, but also upon the phase comparison.

Thus, the invention provides a highly practical and economical operation monitoring means.

Although the input side hybrid circuit $H_3$ is inserted between the input circuit $N_1$ and the two amplifying paths $\mu_1$ and $\mu_2$ this hybrid circuit is by no means an indispensable element. For instance, there is no objection to connecting the input circuit $N_1$ directly to the amplifying paths $\mu_1$ and $\mu_2$.

In short, the amplifier device of the invention is a feedback amplifier having a circuit for providing feedback from the output to the input; an amplifying circuit inserted between the input and output circuits, composed of two or more amplifying paths whose input sides are connected in parallel by arbitrary means while the output sides are connected in parallel by a hybrid circuit group; and having a signal monitoring point at the output side of each of the amplifying paths whereby the interference caused by the output signal of other amplifying path or paths is minimized so that only the output signal of that amplifying path is obtained at the associated monitoring point. Thus the invention is by no means confined to a continuous type amplifier device.

While we have described above the principles of our invention in connection with specific apparatus, it is to be clearly understood that this description is made only by way of example and not as a limitation to the scope of our invention, as set forth in the objects thereof and in the accompanying claim.

What is claimed is:

In a highly reliable amplifier of the negative feedback type in which the same information is amplified in each of a plurality of parallel amplifying paths, each having an input and output side, said amplifier having a D.C. power source connected to energize each amplifying path, a signal information input circuit, a hybrid input isolating circuit connected to said signal input circuit and to the input side of each of said amplifying paths for supplying the same information signal to each amplifying path and for isolating said input sides from each other, a hybrid output isolating circuit connected to the output side of each amplifying path for combining the signals from said amplifying paths and for isolating said output sides from each other, an output circuit connected to receive the thus combined signals from said hybrid output circuit, and a single feedback path connected between said output circuit and said information input circuit for negatively feeding back a component of said combined signal to said information input circuit, an improved arrangement for continuously monitoring the operation of said amplifying paths comprising: a separate transformer having a primary and secondary winding, for each amplifying path, the primary winding of the transformer in each amplifying path being connected between said D.C. power source and the junction between the output side of said amplifying path and said hybrid output isolating circuit; an additional hybrid isolating circuit connected to the secondary windings of all said transformers for combining the signals generated in said secondary windings to be in phase opposing relationship and for isolating the thus generated secondary winding signals from each other; and indicator means coupled to said additional hybrid isolating circuit for receiving said combined signals and for indicating the relative value of the signal components contained in said combined signal.

References Cited by the Examiner

UNITED STATES PATENTS

| | | | |
|---|---|---|---|
| 2,318,662 | 5/1943 | Bidwell et al. | 330—84 X |
| 2,808,473 | 10/1957 | Romander | 330—2 |
| 2,824,296 | 2/1958 | Hecht et al. | 330—2 X |
| 3,072,858 | 1/1963 | Siskind | 330—2 |

ROY LAKE, *Primary Examiner.*